(12) United States Patent
Park et al.

(10) Patent No.: US 10,531,442 B2
(45) Date of Patent: Jan. 7, 2020

(54) METHOD AND APPARATUS FOR TRANSMITTING AND RECEIVING UPLINK DATA CHANNEL ON BASIS OF SUB-PHYSICAL RESOURCE BLOCK FOR MTC TERMINAL

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 0 days.

(21) Appl. No.: 15/934,923

(22) Filed: Mar. 23, 2018

(65) Prior Publication Data

US 2018/0279299 A1    Sep. 27, 2018

(30) Foreign Application Priority Data

Mar. 24, 2017  (KR) .................. 10-2017-0037915
Feb. 21, 2018  (KR) .................. 10-2018-0020339

(51) Int. Cl.
*H04W 72/04*    (2009.01)
*H04W 72/12*    (2009.01)
*H04W 4/70*    (2018.01)

(52) U.S. Cl.
CPC ... *H04W 72/0413* (2013.01); *H04W 72/0453* (2013.01); *H04W 72/1289* (2013.01); *H04W 4/70* (2018.02); *H04W 72/1268* (2013.01)

(58) Field of Classification Search
None
See application file for complete search history.

(56) References Cited

U.S. PATENT DOCUMENTS

2016/0157217 A1*  6/2016  Xue .................. H04L 5/003
                                                              370/330
2017/0134129 A1*  5/2017  You .................. H04W 4/70
2017/0317808 A1*  11/2017 You .................. H04L 5/0055

FOREIGN PATENT DOCUMENTS

WO    2016/064218 A2    4/2016
WO    2016/099057 A1    6/2016

* cited by examiner

*Primary Examiner* — Mohammad S Adhami
(74) *Attorney, Agent, or Firm* — IP Legal Services, LLC

(57) ABSTRACT

Provided are a method for transmitting and receiving an uplink data channel (Physical Uplink Shared Channel, PUSCH) for a Machine Type Communication (MTC) terminal in a 3GPP LTE/LTE-A system. The method for transmitting an uplink data channel (PUSCH) by an MTC terminal, may include receiving information relating to uplink data channel resource allocation in units of sub-Physical Resource Blocks (sub-PRBs) from a base station; and transmitting an uplink data channel on the basis of the information relating to uplink data channel resource allocation to the base station.

9 Claims, 6 Drawing Sheets

FIG.3

```
PUSCH-ResourceAllocation ::= SEQUENCE {
    // ....
    resourceAllocationMode      ENUMERATED { prb, subprb }   OPTIONAL subPRBSize                  ENUMERATED {n3, n4, n6}      OPTIONAL

// ....

}
```

METHOD AND APPARATUS FOR TRANSMITTING AND RECEIVING UPLINK DATA CHANNEL ON BASIS OF SUB-PHYSICAL RESOURCE BLOCK FOR MTC TERMINAL

CROSS REFERENCE TO RELATED APPLICATION

This application claims priority from Korean Patent Application Nos. 10-2017-0037915 & 10-2018-0020339, filed on Mar. 24, 2017 & Feb. 21, 2018, which is hereby incorporated by reference for all purposes as if fully set forth herein.

BACKGROUND OF THE INVENTION

1. Field of the Invention

The present disclosure relates to a method for transmitting and receiving an uplink data channel (Physical Uplink Shared Channel, PUSCH) for a Machine Type Communication (MTC) terminal in a 3rd generation partnership project (3GPP) long term evolution (LTE)/LTE-A system and a method for configuring Downlink Control Information (DCI) and allocating a resource of an uplink data channel for the same. Furthermore, the present disclosure relates to a method for allocating a PUSCH resource in units of sub-Physical Resource Blocks (sub-PRBs).

2. Description of the Prior Art

As LTE networks spread, mobile carriers want to minimize the number of Radio Access Terminals (RAT) to reduce maintenance costs, etc. of the networks. However, machine type communication (MTC) products based on a typical global system for mobile communications (GSM)/general packet radio service (GPRS) network have increased, and a GSM/GPRS network has an advantage of providing MTC using a low data transmission rate, at a low cost.

Therefore, a mobile carrier uses a LTE network to transmit general data and uses a GSM/GPRS network for MTC. Thus, the mobile carrier has a problem of operating two respective RATs. Further, the problem causes inefficient use of a frequency band and burdens a mobile carrier. Therefore, in order to lower the price of the terminal in comparison with a typical LTE terminal, a Bandwidth reduced Low complexity (BL) UE and a Coverage Enhancement (CE) UE have been introduced, wherein the BLE UE has a transmission/reception bandwidth limited to six Physical Resource Blocks (PRBs) and has only one limited transmission/reception antenna, and the CE UE has a CE mode in consideration of an MTC application scenario, such as smart metering installed in a deep indoor environment including a basement. Further, a technology for supporting a corresponding BL/CE terminal, i.e. an MTC terminal, is defined in LTE.

When a method of the typical LTE terminal is used as it is for an uplink data channel of an MTC terminal, an uplink data channel having a bandwidth excessively larger than a transmission/reception bandwidth necessary for the MTC terminal is allocated. Accordingly, spectral efficiency of an uplink may be decreased.

SUMMARY OF THE INVENTION

An aspect of the present embodiments is to provide a specific solution for transmitting and receiving an uplink data channel, wherein the specific solution can improve spectral efficiency with respect to an uplink of an MTC terminal.

One embodiment that has been made to solve the problems described above provides a method for transmitting an uplink data channel (PUSCH) by an MTC terminal, the method including: receiving information relating to uplink data channel resource allocation in units of sub-Physical Resource Blocks (sub-PRBs) from a base station; and transmitting an uplink data channel on the basis of the information relating to uplink data channel resource allocation to the base station.

In addition, one embodiment provides a method for receiving an uplink data channel (PUSCH) by a base station, the method including: transmitting information relating to uplink data channel resource allocation in units of sub-Physical Resource Blocks (sub-PRBs) to an MTC terminal; and receiving an uplink data channel configured on the basis of the information relating to uplink data channel resource allocation from the MTC terminal.

In addition, one embodiment provides an MTC terminal configured to transmit an uplink data channel (PUSCH), the MTC terminal including: a receiver configured to receive information relating to uplink data channel resource allocation in units of sub-Physical Resource Blocks (sub-PRBs) from a base station; and a transmitter configured to transmit an uplink data channel on the basis of the information relating to uplink data channel resource allocation to the base station.

In addition, one embodiment provides a base station configured to receive an uplink data channel (PUSCH), the base station including: a transmitter configured to transmit information relating to uplink data channel resource allocation in units of sub-Physical Resource Blocks (sub-PRBs) to an MTC terminal; and a receiver configured to receive an uplink data channel configured on the basis of the information relating to uplink data channel resource allocation from the MTC terminal.

The present embodiments can provide a specific solution for transmitting and receiving an uplink data channel, wherein the specific solution can improve spectral efficiency with respect to an uplink of an MTC terminal.

BRIEF DESCRIPTION OF THE DRAWINGS

The above and other aspects, features and advantages of the present invention will be more apparent from the following detailed description taken in conjunction with the accompanying drawings, in which:

FIG. 3 is a diagram illustrating an example of transmitting uplink data channel resource allocation information to a terminal through radio resource control (RRC) signaling according to at least one embodiment;

DETAILED DESCRIPTION OF THE EXEMPLARY EMBODIMENTS

Figure 1:
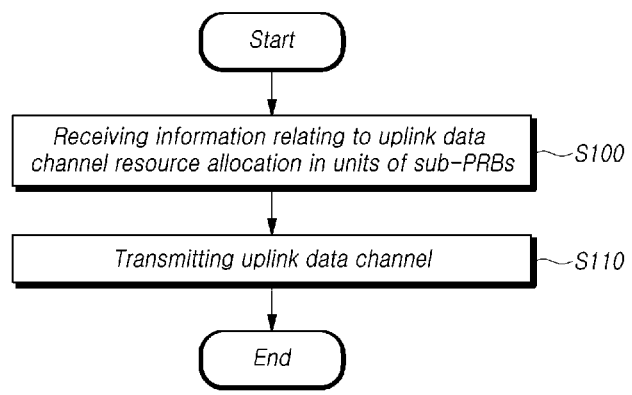
FIG. 1 is a flow chart showing a procedure of transmitting an uplink data channel by a terminal according to at least one embodiment.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure unclear.

In the present specifications, an machine type communication (MTC) terminal refers to a terminal that is low cost (or is not very complex), a terminal that supports coverage enhancement, or the like. In the present specifications, the MTC terminal refers to a terminal that supports low cost (or low complexity) and coverage enhancement. Alternatively, in the present specifications, the MTC terminal refers to a terminal that is defined as a predetermined category for supporting low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release-13 low cost (or low complexity) UE category/type.

The wireless communication system in the present disclosure may be widely installed to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a User Equipment (UE) in wideband code division multiple access (WCDMA), LTE, high speed packet access (HSPA), and the like, and a Mobile station (MS), a User Terminal (UT), a Subscriber Station (SS), a wireless device, and the like in global system for mobile communications (GSM).

A base station or a cell may generally refer to a station where communication with a User Equipment (UE) is performed, and the base station or the cell may also be referred to as a Node-B, an evolved Node-B (eNB), a Sector, a Site, a Base Transceiver System (BTS), an Access Point, a Relay Node, a Remote Radio Head (RRH), a Radio Unit (RU), a small cell, and the like.

That is, the base station or the cell in the present specification may be construed as an inclusive concept indicating a partial area or a function covered by a Base Station Controller (BSC) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, a RRH, an RU, a small cell, and the like.

Each of the above mentioned various cells has a base station that controls a corresponding cell, and thus, the base station may be construed in two ways: i) the base station may be a device itself that provides a megacell, a macrocell, a microcell, a picocell, a femtocell, and a small cell in association with a wireless area; or ii) the base station may indicate a wireless area itself. In i), all devices that interact with one another to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. In ii), a wireless area itself that receives or transmits a signal from a perspective of a user equipment or a neighboring base station, may be indicated as a base station.

Therefore, a megacell, a macrocell, a microcell, a picocell, a femtocell, a small cell, an RRH, an antenna, an RU, a Low Power Node (LPN), a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. The user equipment and the base station are used as two (uplink or downlink) inclusive transceiving subjects to embody the technology and technical concepts described in the present disclosure, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

There is no limit for multiple access schemes applied to a wireless communication system. Various multiple access schemes may be used. For example, such multiple access schemes may include Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields in which the technical idea of the present disclosure is applicable.

Uplink transmission and downlink transmission may be performed based on i) a Time Division Duplex (TDD) scheme that performs transmission based on different times or ii) a Frequency Division Duplex (FDD) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a Physical Downlink Control Channel (PDCCH), a Physical Control Format Indicator Channel (PCFICH), a Physical Hybrid ARQ Indicator Channel (PHICH), a Physical Uplink Control Channel (PUCCH), an Enhanced Physical Downlink Control Channel (EPDCCH), and the like, and may be configured as a data channel, such as a Physical Downlink Shared Channel (PDSCH), a Physical Uplink Shared Channel (PUSCH), and the like, to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an "eNB") and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a channel, such as a PUCCH, a PUSCH, a PDCCH, an EPDCCH, and a PDSCH, or the like, may be described through the expression, "a PUCCH, a PUSCH, a PDCCH, an EPDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Meanwhile, higher layer signaling in the following description includes an RRC signaling that transmits RRC information including an RRC parameter.

An eNB performs downlink transmission to terminals. The eNB may transmit a Physical Downlink Shared Channel (PDSCH) which is a primary physical channel for unicast transmission, and the eNB may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

[CE Mode Definition]

In LTE, two modes including a CEModeA and a CEModeB are defined as a coverage enhancement mode for a BL/CE terminal. A CEModeA is a terminal operation mode for not applying repeated transmissions of wireless channels including an MPDCCH, a PDSCH, a PUSCH, a PUCCH, etc., or applying a small number of the repeated transmissions of the wireless channels to enhance a coverage of a BL/CE terminal. A CEModeB is a terminal operation mode for applying a large number of repeated transmissions of the wireless channels to enhance the coverage. A CE mode is defined to be signaled to enable configuration thereof for each terminal.

[Narrowband Definition]

As described above, a BL/CE terminal may perform data transmission and reception only for 1.4 MHz (i.e. 6 PRBs) through a random subframe regardless of a system bandwidth. Therefore, a transmission/reception band of a random BL/CE terminal is defined in a random up/downlink subframe, a narrowband including consecutive 6 PRBs is defined as a unit for allocating the transmission/reception band, and downlink narrowbands, the number of which is $$NB_{whole} = \left\lfloor \frac{N_{RB}^{DL}}{6} \right\rfloor,$$

and uplink narrowbands, the number of which is $$NB_{whole} = \left\lfloor \frac{N_{RB}^{UL}}{6} \right\rfloor,$$

are configured depending on system bandwidths. When the narrowbands are configured in a random system bandwidth, remaining RB(s) may be calculated by dividing the number of all PRBs included in the corresponding system bandwidth by 6. Such remaining RBs are evenly located at both edges of a system band (when the system bandwidth includes an even number of PRBs), located at a center of the system band (when the system band includes 25 PRBs), or located at both edges and the center of the system band (when the system band includes 15 PRBs or 75 PRBs), respectively. In addition, the PRBs other than the remaining RB(s) may be used to make a bundle of six consecutive PRBs having a sequence in which PRB number increases and may thus constitute the narrowbands.

Particularly, a narrowband configuring method may be defined as below.

Downlink Narrowbands

A narrowband is defined as six non-overlapping consecutive physical resource blocks in a frequency domain. The total number of downlink narrowbands in a downlink transmission bandwidth configured in a cell is given by $$N_{NB}^{DL} = \left\lfloor \frac{N_{RB}^{DL}}{6} \right\rfloor$$

The narrowbands are numbered by $n_{NB}=0, \ldots, N_{NB}^{DL}-1$ in order of the increasing PRB numbers, where a narrowband $N_{NB}$ includes PRB indices below $$\begin{cases} 6n_{NB} + i_0 + i & \text{if } N_{RB}^{DL} \bmod 2 = 0 \\ 6n_{NB} + i_0 + i & \text{if } N_{RB}^{DL} \bmod 2 = 1 \text{ and } n_{NB} < N_{NB}^{DL}/2 \text{ wherein} \\ 6n_{NB} + i_0 + i + 1 & \text{if } N_{RB}^{DL} \bmod 2 = 1 \text{ and } n_{NB} \geq N_{NB}^{DL}/2 \end{cases}$$

$$i = 0, 1, \ldots, 5$$

$$i_0 = \left\lfloor \frac{N_{RB}^{DL}}{2} \right\rfloor - \frac{6N_{NB}^{DL}}{2}$$

Uplink Narrowbands

A narrowband is defined as six non-overlapping consecutive physical resource blocks in the frequency domain. The total number of uplink narrowbands in an uplink transmission bandwidth configured in a cell is given by $$N_{NB}^{UL} = \left\lfloor \frac{N_{RB}^{UL}}{6} \right\rfloor$$

The narrowbands are numbered by $n_{NB}=0, \ldots, N_{NB}^{UL}-1$ in order of the increasing PRB numbers, wherein a narrowband $n_{NB}$ includes PRB indices below $$\begin{cases} 6n_{NB} + i_0 + i & \text{if } N_{RB}^{UL} \bmod 2 = 0 \\ 6n_{NB} + i_0 + i & \text{if } N_{RB}^{UL} \bmod 2 = 1 \text{ and } n_{NB} < N_{NB}^{UL}/2 \text{ wherein} \\ 6n_{NB} + i_0 + i + 1 & \text{if } N_{RB}^{UL} \bmod 2 = 1 \text{ and } n_{NB} \geq N_{NB}^{UL}/2 \end{cases}$$

$$i = 0, 1, \ldots, 5$$

$$i_0 = \left\lfloor \frac{N_{RB}^{UL}}{2} \right\rfloor - \frac{6N_{NB}^{UL}}{2}$$

[Resource Allocation and DCI Format for BL/CE UE]

According to a method for allocating a PDSCH and PUSCH resource for a BL/CE terminal, when a random base station configures DCI including PDSCH or PUSCH resource allocation information for a random BL/CE terminal, the DCI is defined to include narrowband index information and information relating to RB allocation within a corresponding narrowband to allocate a PRB (or VRB) to transmit a PDSCH or PUSCH for the corresponding BL/CE terminal.

In addition, information relating to RB allocation within a corresponding narrowband is configured by a scheme of consecutive VRB resource allocation. Accordingly, a PDSCH is defined to be allocated based on a resource allocation type 2, and a PUSCH is defined to be allocated based on a resource allocation type 0. A PUSCH may be subject to resource allocation based on a resource allocation type 2 only for a BL/CE terminal in which a CEModeB is configured.

In accordance with at least one embodiment, a method may be provided for supporting resource allocation in units of sub-Physical Resource Blocks (sub-PRBs), as a method for improving spectral efficiency of an uplink in comparison with a BL/CE terminal.

Frequency resource allocation for transmitting a PUSCH of a typical BL/CE UE or a non-BL UE, to which a CE mode is applied, is performed in units of 1 RBs. Accordingly, a RB resource is allocated within a narrowband through a DCT format 6-0A based on a resource allocation type 0 and a DCI format 6-0B based on a resource allocation type 2, respectively, according to CE mode configuration (CEModeA or CEModeB).

In accordance with at least one embodiment, a PUSCH resource allocation method may be provided for supporting resource allocation by the unit of a sub-Physical Resource Block (sub-PRB, e.g. three subcarriers) smaller than a Physical Resource Block (PRB) at a frequency axis to improve a PUSCH transmission PSD of a terminal, as a method for improving spectral efficiency with respect to a PUSCH.

The embodiments described in the following description may be applied to a terminal, a base station, and a core network entity (MME) that use all mobile communication technologies. For example, the present embodiments may be also applied to a next generation mobile communication (5G mobile communication, New-RAT) terminal, base station, and core network entity (AMF, Access and Mobility Function), as well as a mobile communication terminal to which a LTE technology is applied.

A sub-Physical Resource Block (sub-PRB) described in the present embodiment implies a Physical Resource Block (PRB) including subcarriers (e.g. three, four, or six subcarriers), the number of which is equal to or smaller than 12, unlike a Physical Resource Block (PRB) which includes 12 subcarriers. (However, the present embodiment is not limited to the term.)

Hereinafter, further various embodiments relating to a method for transmitting and receiving an uplink data channel (PDSCH) by a terminal and a base station, respectively, will be described in detail.

The embodiments described in the following description may be applied individually or in random combination.

Embodiment 1: Sub-Physical Resource Block (Sub-PRB) Based Resource Allocation Configuration A random base station/cell/transmission and reception point may be defined to configure a PUSCH resource allocation mode for a BL/CE terminal that is scheduled through an MPDCCH or a non-BL terminal in which a CE mode is configured, through terminal-specific (UE-specific) or cell-specific higher layer signaling.

In one method for configuring a corresponding PUSCH resource allocation mode, a PUSCH resource allocation mode may be defined to be determined, separately from a CE mode configuration, through a configuration relating to whether a DCI format (e.g. DCI format 6-0A, 6-0B, etc.) based PUSCH resource allocation to which a typical Physical Resource Block (PRB) based resource allocation has been applied is to be performed, or a new DCI format based PUSCH resource allocation on the basis of a newly defined sub-Physical Resource Block (sub-PRB) is to be performed. The corresponding configuration may be made through PUSCH transmission mode configuration.

That is, only Mode 1 is defined as a PUSCH transmission mode for a terminal that is scheduled through a typical MPDCCH. However, a new Mode 2 may be defined, and the corresponding Mode 2 may be defined to imply a sub-Physical Resource Block (sub-PRB) based PUSCH transmission mode.

Otherwise, an information area for directly configuring a typical mode for allocating a PUSCH resource in units of Physical Resource Blocks (PRBs) and a mode for allocating a PUSCH resource in units of sub-Physical Resource Blocks (sub-PRBs), separately from a PUSCH transmission mode configuration, may be defined. Accordingly, a corresponding base station/cell/transmission and reception point may be defined to directly configure a PUSCH resource allocation mode for a random terminal through the information area and then transmit the configured mode through the aforementioned terminal-specific (UE-specific) or cell-specific higher layer signaling.

Another method for configuring a corresponding PUSCH resource allocation mode may be defined to define a new CE mode (e.g. CEModeC) for sub-Physical Resource Block (sub-PRB)-based PUSCH transmission and reception, to allow sub-Physical Resource Block (sub-PRB)-based PUSCH resource allocation through the corresponding CE mode configuration.

A random base station/cell/transmission and reception point may be defined to dynamically performing signaling, through DCI, of a PUSCH resource allocation mode for a BL/CE terminal that is scheduled through an MPDCCH or a non-BL terminal in which a CE mode is configured. That is, an information area for configuring a resource grid type (PRB vs sub-PRB) for frequency resource allocation may be defined in a DCI format for PUSCH resource allocation, and a corresponding terminal may be defined to receive indication relating to whether a resource allocation information area of a corresponding PUSCH is configured based on a typical PRB or a sub-Physical Resource Block (sub-PRB), through the information area.

Embodiment 2: Sub-Physical Resource Block (Sub-PRB) Resource Allocation Method

Embodiment 2-1

In one method for allocating a PUSCH resource in units of sub-Physical Resource Blocks (sub-PRBs) for a BL/CE UE or a non-BL UE, to which a CE mode is applied, the granularity, i.e. the size of a sub-Physical Resource Block (sub-PRB) (the number of consecutive (contiguous) subcarriers) for a corresponding terminal may be defined to be configured to be semi-static through terminal-specific (UE-specific) or cell-specific higher layer signaling and may be defined to include frequency resource allocation information based on the configured granularity of a sub-Physical Resource Block (sub-PRB) through DCI.

Particularly, when the granularity of a sub-Physical Resource Block (sub-PRB) having three types, in which a sub-Physical Resource Block (sub-PRB) for PUSCH resource allocation includes three subcarriers, four subcarriers, or six subcarriers, is supported, a base station may allow a configuration of a type of a sub-Physical Resource Block (sub-PRB) for a random terminal through terminal-specific (UE-specific) or cell-specific higher layer signaling.

When a type of a sub-Physical Resource Block (sub-PRB) is configured through higher layer signaling, the sub-Physical Resource Block may be defined to be indexed according to the configured type of the sub-Physical Resource Block (sub-PRB) in a narrowband, and corresponding {narrowband allocation information+sub-Physical Resource Block (sub-PRB) index allocation information} may be defined to be transmitted through UL grant DCI for PUSCH resource allocation. For example, when the type of a sub-Physical Resource Block (sub-PRB) based on three subcarriers is defined, a total of 24 sub-Physical Resource Blocks (wherein 24 is obtained by multiplying 4 and 6) may be configured through a narrowband of 6 PRBs, each sub-Physical Resource Block including three non-overlapping consecutive subcarriers.

Further, the corresponding sub-Physical Resource Blocks (sub-PRBs) may be indexed by 0 to 23 in a sequence from the sub-Physical Resource Block (sub-PRB) having the highest frequency to the one having the lowest frequency, or the correspnding sub-PRBs may be indexed by 0 to 23 in a sequence, reverse of the former sequence, from the sub-Physical Resource Block (sub-PRB) having the lowest frequency to the one having the highest frequency.

Accordingly, a corresponding UL grant DCI format may be defined to transmit index information of a sub-Physical Resource Block (sub-PRB) allocated for transmitting a PUSCH among sub-Physical Resource Blocks (sub-PRBs) indexed by 0 to 23, together with the aforementioned narrowband allocation information.

Otherwise, indexing of a sub-Physical Resource Block (sub-PRB) according to the type of a sub-Physical Resource Block (sub-PRB) may be defined to be performed by the unit of one PRB. That is, when the type of a sub-Physical Resource Block (sub-PRB) based on three subcarriers is defined like as the aforementioned example, one PRB includes a total of four sub-Physical Resource Blocks (sub-PRBs) each including three non-overlapping consecutive subcarriers. Further, the sub-Physical Resource Blocks (sub-PRBs) may be indexed by 0 to 3 in a sequence from the sub-Physical Resource Block (sub-PRB) having the highest frequency to the one having the lowest frequency, or the sub-PRBs may be indexed by 0 to 3 in a sequence, reverse of the former sequence, from the sub-Physical Resource Block (sub-PRB) having the lowest frequency to the one having the highest frequency. PUSCH resource allocation information transmitted through UL grant DCI may include {narrowband allocation information+information relating to PRB index allocation in a corresponding narrowband+information relating to sub-Physical Resource Block (sub-PRB) index allocation in a corresponding PRB}.

Embodiment 2-2

For another method for allocating a PUSCH resource in units of sub-Physical Resource Blocks (sub-PRBs) for a BL/CE UE or a non-BL terminal in which a CE mode is configured, both the granularity (i.e. the size of a sub-Physical Resource Block (sub-PRB) for a corresponding terminal and PUSCH resource allocation information based on the granularity of the corresponding sub-Physical Resource Block (sub-PRB)) may be defined to be dynamically configured through UL grant DCI.

As an example of the above description, when the granularity of a sub-Physical Resource Block (sub-PRB) having three types, in which a sub-Physical Resource Block (sub-PRB) for PUSCH resource allocation includes three subcarriers, four subcarriers, or six subcarriers, is supported as described above, UL grant DCI may be defined to include an information area for directly indicating the type of a sub-Physical Resource Block (sub-PRB) through UL grant DCI.

Accordingly, a random base station/cell/transmission and reception point and a terminal may be defined to configure and analyze whether PUSCH resource allocation through corresponding UL grant is performed on the basis of a sub-Physical Resource Block (sub-PRB) including three subcarriers or a sub-Physical Resource Block (sub-PRB) including four subcarriers or six subcarriers, according to an information area indicating the type of a corresponding sub-Physical Resource Block (sub-PRB) in the UL grant and then to determine the type of a sub-Physical Resource Block (sub-PRB) that corresponds to a unit for resource allocation through a resource allocation information area in the corresponding UL grant.

Resource allocation for a sub-Physical Resource Block (sub-PRB) through a corresponding resource allocation information area may be performed by a form of {narrowband allocation information+information relating to sub-Physical Resource Block (sub-PRB) index allocation in a narrowband} or {narrowband allocation information+information relating to PRB index allocation+information relating to sub-Physical Resource Block (sub-PRB) index allocation in a PRB}, like Embodiment 2-1.

Otherwise, the type of a sub-Physical Resource Block (sub-PRB) may be defined to be implicitly determined through resource allocation configuration in UL grant. As an example of the above description, a resource allocation information area may be configured by {narrowband allocation information+information relating to sub-Physical Resource Block (sub-PRB) allocation in a narrowband}, and the type and the index of a sub-Physical Resource Block (sub-PRB) for transmitting a corresponding PUSCH may be defined to be determined by using a table mapping scheme according to a configuration of information relating to sub-Physical Resource Block (sub-PRB) allocation in the corresponding narrowband.

For example, information on sub-Physical Resource Block (sub-PRB) allocation within a corresponding narrowband may be defined to have a configuration value of 0 to 53 in total. When the corresponding narrowband includes sub-Physical Resource Blocks (sub-PRBs) each including three consecutive non-overlapping subcarriers, the configuration values of 0 to 23 may be defined to indicate the index of a sub-Physical Resource Block (sub-PRB) allocated among a total of 4*6=24 numbers of sub-Physical Resource Blocks (sub-PRBs) included in the corresponding narrowband. Similarly, when the corresponding narrowband includes sub-Physical Resource Blocks (sub-PRBs) based on four consecutive non-overlapping subcarriers, the configuration values of 24 to 41 may be defined to indicate the index of a sub-Physical Resource Block (sub-PRB) allocated among a total of 3*6=18 numbers of sub-Physical Resource Blocks (sub-PRBs) included in the corresponding narrowband and based on four subcarriers. Finally, when the corresponding narrowband includes sub-Physical Resource Blocks (sub-PRBs) based on six consecutive non-overlapping subcarriers, the configuration values of 42 to 53 may be defined to indicate the index of a sub-Physical Resource Block (sub-PRB) allocated among a total of 2*6=12 numbers of sub-Physical Resource Blocks (sub-PRBs) included in the corresponding narrowband and based on six subcarriers.

As an another example of the above description, a resource allocation information area may be defined to be configured by {narrowband allocation information+PRB index allocation information+information on sub-Physical Resource Block (sub-PRB) allocation in a PRB}, and the type and the index of a sub-Physical Resource Block (sub-PRB) for transmitting a corresponding PUSCH may be defined to be determined by using a table mapping scheme according to a configuration of information on sub-Physical Resource Block (sub-PRB) allocation in the corresponding PRB.

For example, information on sub-Physical Resource Block (sub-PRB) allocation within a corresponding PRB may be defined to have a configuration value of 0 to 8 in total. When a PRB allocated through {narrowband allocation information+PRB index allocation information} is configured by a sub-Physical Resource Block (sub-PRB) based on three consecutive non-overlapping subcarriers, the configuration values of 0 to 3 may be defined to indicate the index of a sub-Physical Resource Block (sub-PRB) allocated among a total of four numbers of sub-Physical Resource Blocks (sub-PRBs) included in the corresponding PRB. Similarly, when the allocated PRB is configured by a sub-Physical Resource Block (sub-PRB) based on four consecutive non-overlapping subcarriers, the configuration values of 4 to 6 may be defined to indicate the index of a sub-Physical Resource Block (sub-PRB) allocated among a total of three numbers of sub-Physical Resource Blocks (sub-PRB) included in the corresponding PRB. Finally, when the corresponding allocated PRB is configured by a sub-Physical Resource Block (sub-PRB) based on six consecutive non-overlapping subcarriers, the configuration values of 7 to 8 may be defined to indicate the index of a sub-Physical Resource Block (sub-PRB) allocated among a total of 2 numbers of sub-Physical Resource Blocks (sub-PRBs) included in the corresponding PRB.

Although the aforementioned embodiment has been described on the basis of a case where the number of subcarriers included in a sub-Physical Resource Block (sub-PRB) is 3, 4, or 6, it is clear that the present embodiment can be applied to all the types of a sub-Physical Resource Block (sub-PRB) including subcarriers, the number of which corresponds to the aliquot part of 12 or all of the natural numbers smaller than 12.

FIG. 1 is a flow chart showing a procedure of transmitting an uplink data channel by a terminal according to at least one embodiment.

Referring to FIG. 1, a terminal may receive information on uplink data channel resource allocation in units of sub-Physical Resource Blocks (sub-PRBs) from a base station (S100).

The uplink data channel resource allocation information is configured based on information on frequency section configuration in units of sub-Physical Resource Blocks (sub-PRBs).

The terminal may receive uplink data channel resource allocation information through terminal-specific (UE-specific) or cell-specific higher layer signaling (e.g. RRC signaling). In addition, the terminal can receive uplink data channel resource allocation information through downlink control information (DCI). Hereinafter, one example, in which uplink data channel resource allocation information is transmitted to a terminal through RRC signaling or DCI, will be described with reference to FIG. 3 and FIG. 4.

The number of subcarriers that may be included in a sub-Physical Resource Block (sub-PRB) can be selected from among random integers equal to or smaller than 12. However, the number of subcarriers included in a sub-Physical Resource Block (sub-PRB) may be configured to be only an integer satisfying a particular condition.

For example, the number of subcarriers in a sub-Physical Resource Block (sub-PRB) may be one selected from among elements of a set including all or some of the aliquot parts of 12. For example, the number of subcarriers in a sub-Physical Resource Block (sub-PRB) may be one among {1, 2, 3, 4, 6} that is a set of the aliquot parts of 12, and may be one among {3, 4, 6} that is a subset of {1, 2, 3, 4, 6}. When the number of subcarriers in a sub-Physical Resource Block (sub-PRB) is an aliquot part of 12, one Physical Resource Block (PRB) can be divided into sub-Physical Resource Blocks (sub-PRBs), the number of which is an integer.

For another example, the number of subcarriers in a sub-Physical Resource Block (sub-PRB) may be configured to be 3 and 6 that satisfy a particular function, 3* (2^n) (wherein, n=0 and 1).

As described above, when a condition of the number of subcarriers in a sub-Physical Resource Block (sub-PRB) is limited and when a base station transmits resource allocation information for an uplink data channel to a terminal, the size of information required for notifying of a unit of a sub-Physical Resource Block (sub-PRB) is reduced. Therefore, transmission efficiency is increased.

When a resource of an uplink data channel is allocated in units of sub-Physical Resource Blocks (sub-PRBs) in the frequency domain, the length of a resource unit (RU) indicating a unit of a time section resource allocated to the uplink data channel, i.e. the number of subframes included in the resource unit, may be determined for rate matching by the number of subcarriers included in a sub-Physical Resource Block (sub-PRB).

For example, when the number of subcarriers in a sub-Physical Resource Block (sub-PRB) is three, a unit of a resource allocated in a frequency section is reduced to ¼ in comparison with the existing resource allocation in units of PRBs. Therefore, a length of a resource unit in a time section may correspond to four subframes.

For another example, when the number of subcarriers included in a sub-Physical Resource Block (sub-PRB) is six, a unit of a resource allocated in a frequency section is reduced to ½ in comparison with the existing resource allocation in units of PRBs. Therefore, a length of a resource unit in a time section may correspond to two subframes.

As described above, when the number of subframes included in a resource unit is N, and the number of subcarriers included in a sub-Physical Resource Block (sub-PRB) is K, N and K may be determined to satisfy an equation $N*K=12$.

The terminal may transmit an uplink data channel to the base station on the basis of the uplink data channel resource allocation information received from the base station (S110).

When a frequency resource for the uplink data channel is allocated in units of sub-Physical Resource Blocks (sub-PRBs), the maximum number of subframes included in an uplink data channel resource in a time axis may vary according to the aforementioned CE mode. For example, as described above, in a case of a CEModeA, repeated transmissions of an uplink data channel do not occur or occur a small number of times. Therefore, an uplink data channel resource may include a small number (e.g. up to a maximum of 16 or 32) of subframes. In a case of a CEModeB, a large number of repeated transmissions may occur for coverage enlargement. Therefore, an uplink data channel resource may include subframes, the number (e.g. up to a maximum of 1024 or 2048) of which is larger than that of a CEModeA.

For example, in the case of uplink data channel transmission, when a CEModeA is used, the maximum possible number of subframes is 32, and a sub-Physical Resource Block (sub-PRB) includes six subcarriers, the length of a resource unit (RU) corresponding a unit of an uplink data channel resource in a time axis corresponds to two subframes. Therefore, resource units, the number of which is maximally 16 calculated by dividing 32 by 2 may be allocated for transmitting an uplink data channel. That is, the maximum number of resource units that can be allocated for transmitting an uplink data channel may be a value calculated by dividing (the maximum possible number of subframes) by (the number of subframes per resource unit).

The time section length of an uplink data channel resource in each CE mode may be expressed by the length of a resource unit (RU) according to a sub-Physical Resource Block (sub-PRB).

For example, in the case of uplink data channel transmission, when a CEModeA is used, the maximum possible number of resource units is 32, and a sub-Physical Resource Block (sub-PRB) includes six subcarriers, the length of a resource unit (RU) corresponding a unit of an uplink data channel resource in a time axis corresponds to two subframes. Therefore, the subframes, the number of which is maximally 64 calculated by multiplying 32 by 2 may be allocated for transmitting an uplink data channel. That is, the maximum number of subframes that can be allocated for transmitting an uplink data channel may be a value calculated by multiplying (the maximum possible number of resource units) by (the number of subframes per resource unit).

Figure 2:
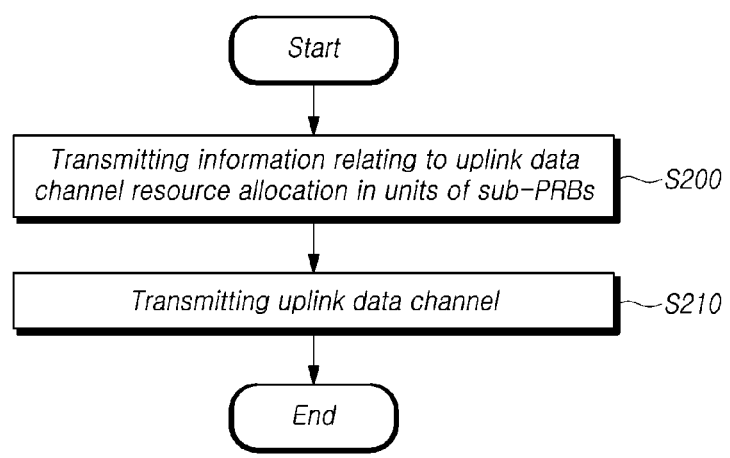
FIG. 2 is a flow chart showing a procedure of receiving an uplink data channel by a base station according to at least one embodiment.

FIG. 2 is a flow chart showing a procedure of receiving an uplink data channel by a base station according to at least one embodiment.

Referring to FIG. 2, the base station may transmit information on uplink data channel resource allocation in units of sub-Physical Resource Blocks (sub-PRBs) to the terminal (S200).

The uplink data channel resource allocation information is configured on the basis of information on frequency section configuration in units of sub-Physical Resource Blocks (sub-PRBs).

The base station may transmit the uplink data channel resource allocation information through terminal-specific (UE-specific) or cell-specific higher layer signaling (e.g. RRC signaling). In addition, the terminal may transmit uplink data channel resource allocation information through DCI. Hereinafter, one example, in which uplink data channel resource allocation information is transmitted by a base station through RRC signaling or DCI, will be described with reference to FIG. 3 and FIG. 4.

The number of subcarriers included in a sub-Physical Resource Block (sub-PRB) can be selected from among random integers equal to or smaller than 12, as described above with reference to FIG. 1. However, the number of subcarriers in a sub-Physical Resource Block (sub-PRB) may be configured to be only an integer satisfying a particular condition.

As an example, the number of subcarriers in a sub-Physical Resource Block (sub-PRB) may be one selected from among elements of a set including all or some of the aliquot parts of 12, as described above with reference to FIG. 1. In another example, the number of subcarriers in a sub-Physical Resource Block (sub-PRB) may be configured to be 3 and 6 that satisfy a particular function, $3*(2^n)$ (wherein, n=0 and 1).

As described above with reference to FIG. 1, when a frequency resource of an uplink data channel is allocated in units of sub-Physical Resource Blocks (sub-PRBs), the length of a resource unit (RU) indicating a unit of a time section resource allocated to the uplink data channel, i.e. the number of subframes included in the resource unit, may be determined for rate matching by the number of subcarriers included in a sub-Physical Resource Block (sub-PRB). For example, when the number of subframes included in a resource unit is N, and the number of subcarriers included in a sub-Physical Resource Block (sub-PRB) is K, N and K may be determined to satisfy an equation $N*K=12$.

The base station may receive an uplink data channel configured base on the aforementioned uplink data channel resource allocation information from the terminal (S210).

As described above with reference to FIG. 1, when a resource for the uplink data channel is allocated in units of sub-Physical Resource Blocks (sub-PRBs), the maximum number of subframes included in an uplink data channel resource in a time axis may vary according to the aforementioned CE mode.

For example, as described above, in a case of a CEModeA, repeated transmissions of an uplink data channel do not occur or occur a small number of times. Therefore, an uplink data channel resource may include a small number (e.g. up to a maximum of 16 or 32) of subframes. In a case of a CEModeB, a large number of repeated transmissions may occur for coverage enlargement. Therefore, an uplink data channel resource may include subframes, the number (e.g. up to a maximum of 1024 or 2048) of which is larger than that of a CEModeA.

The time section length of an uplink data channel resource in each CE mode may be expressed by the length of a resource unit (RU) according to a sub-Physical Resource Block (sub-PRB).

FIG. 3 is a diagram illustrating an example of transmitting uplink data channel resource allocation information to a terminal through RRC signaling according to at least one embodiment.

Referring to FIG. 3, in relation to PUSCH-ResourceAllocation (the present embodiment is not limited to the term) for transmitting uplink data channel resource allocation information to a terminal, whether to perform resource allocation in units of PRBs like the allocation, or to perform resource Allocation in units of sub-Physical Resource Blocks (sub-PRBs) may be transmitted through a parameter of resourceAllocationMode (the present embodiment is not limited to the term). In addition, when resource allocation is performed in units of sub-PRBs, the granularity of a sub-PRB, i.e. the number of subcarriers included in a sub-PRB, may be transmitted through a parameter of subPRBSize (the present embodiment is not limited to the term). As described above with reference to FIG. 1, the number of subcarriers that may be included in a sub-PRB may be one selected from among particular integers (in the present embodiment, 3, 4, and 6) instead of a random integer equal to or smaller than 12.

Figure 4:
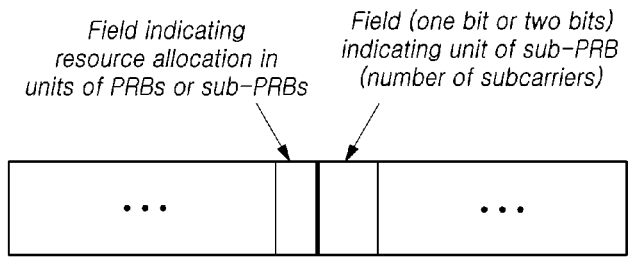
FIG. 4 is a diagram illustrating an example of transmitting uplink data channel resource allocation information to a terminal through downlink control information (DCI) according to at least one embodiment.

FIG. 4 is a diagram illustrating an example of transmitting uplink data channel resource allocation information to a terminal through DCI according to at least one embodiment.

Referring go FIG. 4, a DCI format for PUSCH resource allocation may additionally include a field indicating whether to use i) a scheme of allocating a resource in units of PRBs or ii) a scheme of allocating a resource in units of sub-PRBs. The field may be configured at one bit.

The DCI format for PUSCH resource allocation may additionally include a field indicating a unit of a sub-PRB, i.e. the number of subcarriers included in one sub-PRB. When a unit of a sub-PRB is a random integer equal to or smaller than 12, a corresponding filed requires a total of four bits. However, when the possible number of subcarriers that may be included in a sub-PRB is limited as described above, a corresponding field may require only one bit (the possible number of subcarriers is 2 or less, e.g. 3, 6) or two bits (the possible number of subcarriers is 4 or less, e.g. 3, 4, 6).

Figure 5:
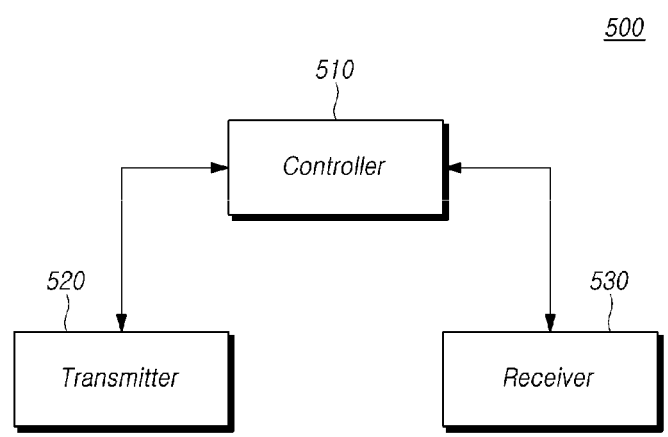
FIG. 5 is a diagram showing a base station according to at least one embodiment.

FIG. 5 is a diagram showing a base station according to at least one embodiment. Referring to FIG. 5, a base station 500 includes a controller 510, a transmitter 520, and a receiver 530.

The controller 510 may be configured to control overall operations for receiving, by the base station 500, an uplink data channel from a terminal.

The transmitter 520 and the receiver 530 may be confirmed for transmitting/receiving a signal or a message, and data needed for performing the aforementioned present disclosure to/from the terminal.

The transmitter 520 may transmit information on uplink data channel resource allocation in units of sub-Physical Resource Blocks (sub-PRBs) to the terminal.

The uplink data channel resource allocation information is configured on the basis of information on frequency section configuration in units of sub-Physical Resource Blocks (sub-PRBs).

The base station may transmit the uplink data channel resource allocation information through terminal-specific (UE-specific) or cell-specific higher layer signaling (e.g. RRC signaling) to the terminal. In addition, the base station can transmit uplink data channel resource allocation information through DCI to the terminal.

The number of subcarriers in a sub-Physical Resource Block (sub-PRB) can be selected from among random integers equal to or smaller than 12. However, the number of subcarriers in a sub-Physical Resource Block (sub-PRB) may be configured to be only an integer satisfying a particular condition.

As an example, the number of subcarriers in a sub-Physical Resource Block (sub-PRB) may be one selected from among elements of a set including all or some of the aliquot parts of 12. For example, the number of subcarriers that may be included in a sub-Physical Resource Block (sub-PRB) may be one among $\{1, 2, 3, 4, 6\}$ that is a set of the aliquot parts of 12, and may be one among $\{3, 4, 6\}$ that is a subset of $\{1, 2, 3, 4, 6\}$. When the number of subcarriers that may be included in a sub-Physical Resource Block (sub-PRB) is an aliquot part of 12, one Physical Resource Block (PRB) can be divided into sub-Physical Resource Blocks (sub-PRBs), the number of which is an integer.

In another example, the number of subcarriers that may be included in a sub-Physical Resource Block (sub-PRB) may be configured to be 3 and 6 that satisfy a particular function, $3*(2^n)$ (wherein, n=0 and 1).

As described above, when a condition with respect to the number of subcarriers that may be included in a sub-Physical Resource Block (sub-PRB) is limited and when a base station transmits resource allocation information for an uplink data channel to a terminal, the size of information required for notifying of a unit of a sub-Physical Resource Block (sub-PRB) is reduced. Therefore, transmission efficiency is improved.

When a resource of an uplink data channel is allocated in units of sub-Physical Resource Blocks (sub-PRBs), the length of a resource unit (RU) indicating the unit of a time section resource allocated to the uplink data channel, i.e. the number of subframes included in the resource unit, may be determined for rate matching by the number of subcarriers included in a sub-Physical Resource Block (sub-PRB).

For example, when the number of subcarriers included in a sub-Physical Resource Block (sub-PRB) is three, a unit of a resource allocated in a frequency section is reduced to ¼ in comparison with the existing resource allocation in units of PRBs. Therefore, a length of a resource unit in a time section may correspond to four subframes.

For another example, when the number of subcarriers in a sub-Physical Resource Block (sub-PRB) is six, a unit of a resource allocated in a frequency section is reduced to ½ in comparison with the existing resource allocation in units of PRBs. Therefore, a length of a resource unit in a time section may correspond to two subframes.

As described above, when the number of subframes in a resource unit is N, and the number of subcarriers included in a sub-Physical Resource Block (sub-PRB) is K, N and K may be determined to satisfy an equation $N*K=12$.

When a frequency resource for the uplink data channel is allocated in units of sub-Physical Resource Blocks (sub-PRBs), the maximum number of subframes included in an uplink data channel resource in a time axis may vary according to the aforementioned CE mode.

For example, as described above, in a case of a CEModeA, repeated transmissions of an uplink data channel do not occur or occur a small number of times. Therefore, an uplink data channel resource may include a small number (e.g. up to a maximum of 16 or 32) of subframes. In a case of a CEModeB, a large number of repeated transmissions may occur for coverage enlargement. Therefore, an uplink data channel resource may include subframes, the number (e.g. up to a maximum of 1024 or 2048) of which is larger than that of a CEModeA.

The time section length of an uplink data channel resource in each CE mode may be expressed by the length of a resource unit (RU) according to a sub-Physical Resource Block (sub-PRB).

The receiver 530 may receive an uplink data channel configured on the basis of the uplink data channel resource allocation information transmitted by the transmitter 520 from the terminal.

Figure 6:
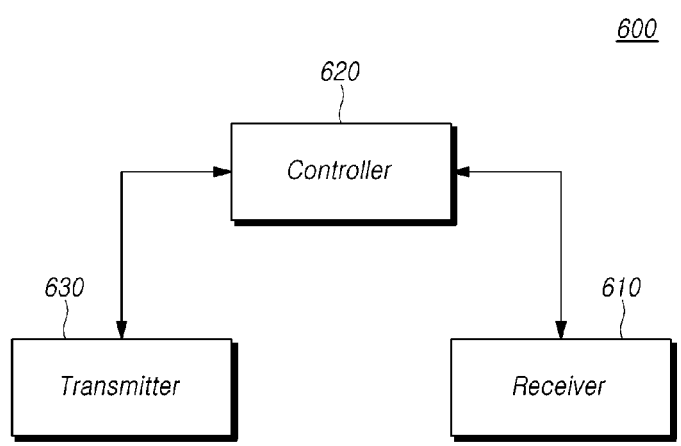
FIG. 6 is a diagram showing a terminal according to at least one embodiment.

FIG. 6 is a diagram showing a terminal according to at least one of embodiments.

Referring to FIG. 6, a terminal 600 includes a receiver 610, a controller 620, and a transmitter 630.

The receiver 610 receives control information and data, and a message from a base station. Particularly, the receiver 610 may receive information on uplink data channel resource allocation in units of sub-Physical Resource Blocks (sub-PRBs) from the base station.

The uplink data channel resource allocation information is configured on the basis of information on frequency section configuration in units of sub-Physical Resource Blocks (sub-PRBs).

The terminal may receive uplink data channel resource allocation information through terminal-specific (UE-specific) or cell-specific higher layer signaling (e.g. RRC signaling). In addition, the terminal can receive uplink data channel resource allocation information through DCI.

The number of subcarriers in a sub-Physical Resource Block (sub-PRB) can be selected from among random integers equal to or smaller than 12. However, the number of subcarriers in a sub-Physical Resource Block (sub-PRB) may be configured to be only an integer satisfying a particular condition.

As described above, as an example, the number of subcarriers that may be included in a sub-Physical Resource Block (sub-PRB) may be one selected from among elements of a set including all or some of the aliquot parts of 12. For example, the number of subcarriers that may be included in a sub-Physical Resource Block (sub-PRB) may be one among $\{1, 2, 3, 4, 6\}$ that is a set of the aliquot parts of 12, and may be one among $\{3, 4, 6\}$ that is a subset of $\{1, 2, 3, 4, 6\}$. When the number of subcarriers that may be included in a sub-Physical Resource Block (sub-PRB) is an aliquot part of 12, one Physical Resource Block (PRB) can be divided into sub-Physical Resource Blocks (sub-PRBs), the number of which is an integer.

In another example, the number of subcarriers that may be included in a sub-Physical Resource Block (sub-PRB) may be configured to be 3 and 6 that satisfy a particular function, $3*(2^n)$ (wherein, n=0 and 1).

As described above, in a case when a condition with respect to the number of subcarriers that may be included in a sub-Physical Resource Block (sub-PRB) is limited, when a base station transmits resource allocation information for an uplink data channel to a terminal, the size of information required for notifying of a unit of a sub-Physical Resource Block (sub-PRB) is reduced. Therefore, transmission efficiency is increased.

When a resource of an uplink data channel is allocated in units of sub-Physical Resource Blocks (sub-PRBs), the length of a resource unit (RU) indicating the unit of a time section resource allocated to the uplink data channel, i.e. the number of subframes included in the resource unit, may be determined for rate matching by the number of subcarriers included in a sub-Physical Resource Block (sub-PRB).

For example, when the number of subcarriers included in a sub-Physical Resource Block (sub-PRB) is three, a unit of a resource allocated in a frequency section is reduced to ¼ in comparison with the existing resource allocation in units of PRBs. Therefore, a length of a resource unit in a time section may correspond to four subframes.

For another example, when the number of subcarriers included in a sub-Physical Resource Block (sub-PRB) is six, a unit of a resource allocated in a frequency section is reduced to ½ in comparison with the existing resource allocation in units of PRBs. Therefore, a length of a resource unit in a time section may correspond to two subframes.

As described above, when the number of subframes included in a resource unit is N, and the number of subcarriers included in a sub-Physical Resource Block (sub-PRB) is K, N and K may be determined to satisfy an equation $N*K=12$.

The controller 620 controls overall terminal operations for transmitting an uplink data channel by the terminal.

The transmitter 630 may transmit an uplink data channel on the basis of the uplink data channel resource allocation information received by the receiver 610 to the base station.

As described above, when a resource for the uplink data channel is allocated in units of sub-Physical Resource Blocks (sub-PRBs), the maximum number of subframes included in an uplink data channel resource in a time axis may vary according to the aforementioned CE mode.

For example, as described above, in a case of a CEModeA, repeated transmissions of an uplink data channel do not occur or occur a small number of times. Therefore, an uplink data channel resource may include a small number (e.g. up to a maximum of 16 or 32) of subframes. In a case of a CEModeB, a large number of repeated transmissions may occur for coverage enlargement. Therefore, an uplink data channel resource may include subframes, the number (e.g. up to a maximum of 1024 or 2048) of which is larger than that of a CEModeA.

The time section length of an uplink data channel resource in each CE mode may be expressed by the length of a resource unit (RU) according to a sub-Physical Resource Block (sub-PRB).

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

Although the above description has been made for illustratively explaining the technical idea of the present disclosure, those skilled in the art will appreciate that various modifications, additions and substitutions are possible, without departing from the scope and spirit of the disclosure as disclosed in the accompanying claims. Accordingly, the embodiments of the present disclosure are only for describing, but not limiting, the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

What is claimed is:

1. A method for transmitting an uplink data channel (PUSCH) by a terminal, the method comprising:
   receiving resource allocation mode information for a PUSCH through radio resource control (RRC) signaling;
   receiving uplink data channel resource allocation information from a base station;
   determining a number and indices of subcarriers in sub-Physical Resource Blocks (sub-PRBs) based on the PUSCH resource allocation information and a preset table information, if information indicating resource allocation in units of sub-PRBs is received;
   transmitting the PUSCH by using a resource unit (RU) determined based on the number of subcarriers to the base station,
   wherein the uplink data channel resource allocation information is configured based on information on frequency section configuration in units of sub-Physical Resource Blocks (sub-PRBs),
   wherein the resource allocation mode information indicates whether to support resource allocation in units of sub-PRBs,
   wherein the information indicating resource allocation in units of sub-PRBs is included in a downlink control information (DCI), and
   wherein the RU corresponds to a unit with respect to a time section resource of the PUSCH, and a value obtained by multiplying the number of subcarriers by a time length of the RU is set to be constant regardless of the number of subcarriers.

2. The method of claim 1, wherein the PUSCH resource allocation information is received through radio resource control (RRC) signaling.

3. The method of claim 1, wherein the PUSCH resource allocation information is received through downlink control information (DCI).

4. A method for receiving an uplink data channel (PUSCH) by a base station, the method comprising:
   transmitting resource allocation mode information for a PUSCH through radio resource control (RRC) signaling;
   transmitting PUSCH resource allocation information to a terminal; and
   receiving the PUSCH by using a resource unit (RU) determined based on a number of subcarriers in sub-Physical Resource Blocks (sub-PRBs) from the terminal, the number of subcarriers is determined based on the PUSCH resource allocation information and a preset table information, if information indicating resource allocation in units of sub-PRBs is transmitted,
   wherein the uplink data channel resource allocation information is configured based on information on frequency section configuration in units of sub-Physical Resource Blocks (sub-PRBs),
   wherein the resource allocation mode information indicates whether to support resource allocation in units of sub-PRBs,
   wherein the information indicating resource allocation in units of sub-PRBs is included in a downlink control information (DCI), and
   wherein the RU corresponds to a unit with respect to a time section resource of the PUSCH, and a value obtained by multiplying the number of subcarriers by a time length of the RU is set to be constant regardless of the number of subcarriers.

5. The method of claim 4, wherein the PUSCH resource allocation information is transmitted to the terminal through radio resource control (RRC) signaling.

6. The method of claim 4, wherein the PUSCH resource allocation information is transmitted to the terminal through downlink control information (DCI).

7. A terminal configured to transmit an uplink data channel (PUSCH), the terminal comprising:
   a receiver configured to receive resource allocation mode information for a PUSCH through radio resource control (RRC) signaling and receive uplink data channel resource allocation information from a base station;
   a controller configured to determine a number and indices of subcarriers in sub-Physical Resource Blocks (sub-PRBs) based on the PUSCH resource allocation information and a preset table information, if information indicating resource allocation in units of sub-PRBs is received;
   a transmitter configured to transmit the PUSCH by using a resource unit (RU) determined based on the number of subcarriers to the base station,
   wherein the uplink data channel resource allocation information is configured based on information on frequency section configuration in units of sub-Physical Resource Blocks (sub-PRBs),
   wherein the resource allocation mode information indicates whether to support resource allocation in units of sub-PRBs,
   wherein the information indicating resource allocation in units of sub-PRBs is included in a downlink control information (DCI), and
   wherein the RU corresponds to a unit with respect to a time section resource of the PUSCH, and a value obtained by multiplying the number of subcarriers by a time length of the RU is set to be constant regardless of the number of subcarriers.

8. The terminal of claim 7, wherein the PUSCH resource allocation information is received through radio resource control (RRC) signaling.

9. The terminal of claim 7, wherein the PUSCH resource allocation information is received through downlink control information (DCI).

* * * * *